Figure 1:
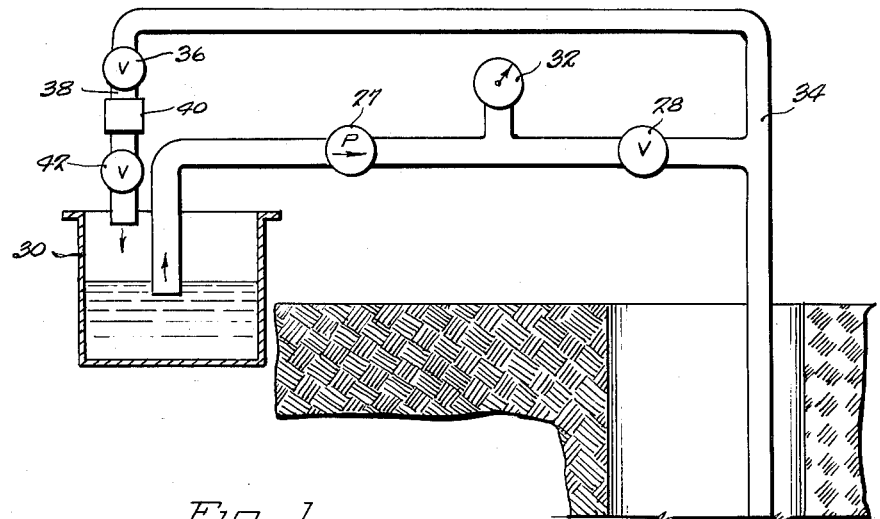

Dec. 7, 1965     J. H. MALMBERG     3,221,833
GEOPHYSICAL BOREHOLE APPARATUS
Filed May 2, 1962

INVENTOR
JOHN H MALMBERG
BY Soans, Anderson, Luedeka & Fitch
ATTORNEYS

United States Patent Office 3,221,833
Patented Dec. 7, 1965

3,221,833
GEOPHYSICAL BOREHOLE APPARATUS
John H. Malmberg, Del Mar, Calif., assignor to General Dynamics Corporation, New York, N.Y., a corporation of Delaware
Filed May 2, 1962, Ser. No. 191,995
1 Claim. (Cl. 181—.5)

The present invention relates to geophysical prospecting and more particularly to an improved apparatus for generating seismic waves.

Geophysical prospecting is a technique employed to determine the sub-surface structure of the earth, such as the geometry of sedimentary strata. This information is a valuable guide to the location of natural resource deposits, such as ore deposits, petroleum deposits, etc.

The technique comprises the transmitting of vibratory energy into the earth and recording and interpreting the vibrations that return to the surface after reflection from, or refraction along boundaries between geological formations.

Seismic waves are conventionally introduced into the earth by exploding a high explosive in a shot hole drilled to a depth of up to several hundred feet into the earth.

There are many disadvantages inherent to this type of seismic wave source. Perhaps the most important of these is the fundamentally "one-shot" nature of the process. Frequently the hole caves in from the explosion, necessitating expensive redrilling for subsequent shots. Even if the condition of the hole permits reloading, the shock wave from the previous explosion has permanently altered the ground nearby and the second record is likely to differ materially from the first. In addition, explosives are expensive forms of energy, and are expensive to handle and especially to transport to remote areas.

A second severe disadvantage to using expolsives is that the seismologist has little or no control over the frequencies generated by the source. The pressure generated in the shot hole is complicated, but usually resembles a spike and square wave combined. As a result, a great deal of energy is put into high frequencies where it is useless for seismic reflections. The energy in the useful frequency range is also of more than one frequency and hence most of the information that could be obtained from interference between the waves reflected from adjacent boundaries is lost.

Arrays of monochromatic sources can be used to make beams of sound. Such arrays could be used to great advantage in seismic work. Since the spacing of the elements in such an array depends on the wavelength, which is inversely proportional to the frequency, such a system is much more effective with a monochromatic source of sound than with a non-monochromatic one.

In geophysical prospecting background noise from earthquakes, highway traffic, airplanes, earthmoving, drilling operations, etc., often makes it difficult to distinguish the useful reflected or refracted signal at the recorder. The reflected or refracted signals may be more easily distinguished from the noise by providing a repetitive source of seismic waves. In this connection, if many records are available with the same time signal superimposed on a random noise background, the signal may be extracted from the noise by well known statistical methods. However, the economics of the explosive method severely limits the use of repetitive shooting to improve the signal to noise ratio.

If an array of sources is used to form a beam, it is necessary to aim the beam in various directions on successive shots in order to explore the structure in all directions from the array. Again this requires repetitive measurements. If the frequency generated by the source is controllable, it is desirable to make measurements at various frequencies, especially if one wishes to interpret interference patterns. This again requires multiple measurements.

Some of the disadvantages inherent in the use of explosives have been apparent to those skilled in the seismic art, and there have been various attempts to provide an improved source of seismic waves.

In one system, a frequency modulated, sinusoidal pressure is applied to the surface of the earth. The source includes two counter-rotating, eccentrically mounted fly wheels which are brought up to speed and then rapidly slowed down to provide frequency modulation. The repetitive nature of this system allows averaging to improve the signal to noise ratio. However, this system has other important disadvantages. First, the pressure may only be applied to the surface or weathered layer of the earth, because the source is of such a size that it is impossible to lower it into a bore hole. The weathered layer often distorts geophysical measurements in amounts disproportionate to its thickness.

Second, and the most important disadvantage of this device is its weight. The maximum peak to peak force exerted by such a device is limited to twice its weight. If this limit is exceeded it will leave the ground. Since the energy radiated in seismic waves is proportional to the square of the peak to peak force, any reduction in the weight of the device greatly reduces the radiated energy. The radiated energy from such devices is uncomfortably small even when their weight is a few tons—which is already too heavy for easy portability.

In another repetitive system, a heavy weight is dropped upon the surface or weathered layer of the earth. This method also provides a seismic source which is feeble, heavy, operable only on the surface, and not capable of providing a pressure which is programmed in time.

A further repetitive system involves a flexible bag filled with water and lowered to the bottom of a bore hole. An anchoring mechanism is inserted to hold the bag down. This bag is then pressurized cyclically. This method allows the source to be put at any depth in the ground, and allows an arbitrary program of pressure with time. However, this method suffers from a very severe disadvantage, namely, that the pressure and hence the radiated energy is limited to a very low value by the strength of the bag, which is made of relatively very weak materials, such as rubber. Unless the bag is perfectly constrained by the hole walls and bottom and the anchor, the bag extrudes into some crack and breaks even if it is not punctured by some imperfection on the wall of the bore hole. If the anchor is omitted, the pressure is even more limited since then the bag may bulge at the top and break. In any event, the pressure is limited by the strength of the anchor and the strength of its attachment to the walls of the hole. Finally, the source must be operated at the bottom of the bore hole which is a clear disadvantage in some circumstances.

It is the general object of the present invention to provide an improved apparatus for applying stresses to the earth for the purpose of generating seismic waves. Another object of the invention is to provide an improved apparatus for generating seismic waves which allows repetitive, identical "shots."

Another object of the invention is the provision of a repetitive source of seismic waves which is capable of being operated in a bore hole. Still another object is the provision of a source of seismic waves which is sufficiently powerful to obtain deep reflections in the earth. Still another object of this invention is the provision of apparatus for applying stresses to the earth which are not limited by the weight of the apparatus or the strength of the materials used in forming the apparatus. A further object is the provision of apparatus for applying stresses to the earth which are an arbitrary function of time.

A further object is the provision of a seismic wave source which is capable of generating substantially single frequency waves and a method of generating such waves. Still a further object is the provision of a seismic wave source which is small, light and relatively inexpensive to manufacture and operate.

Other objects and advantages of the present invention will become apparent by reference to the following description and accompanying drawings.

Figure 2:
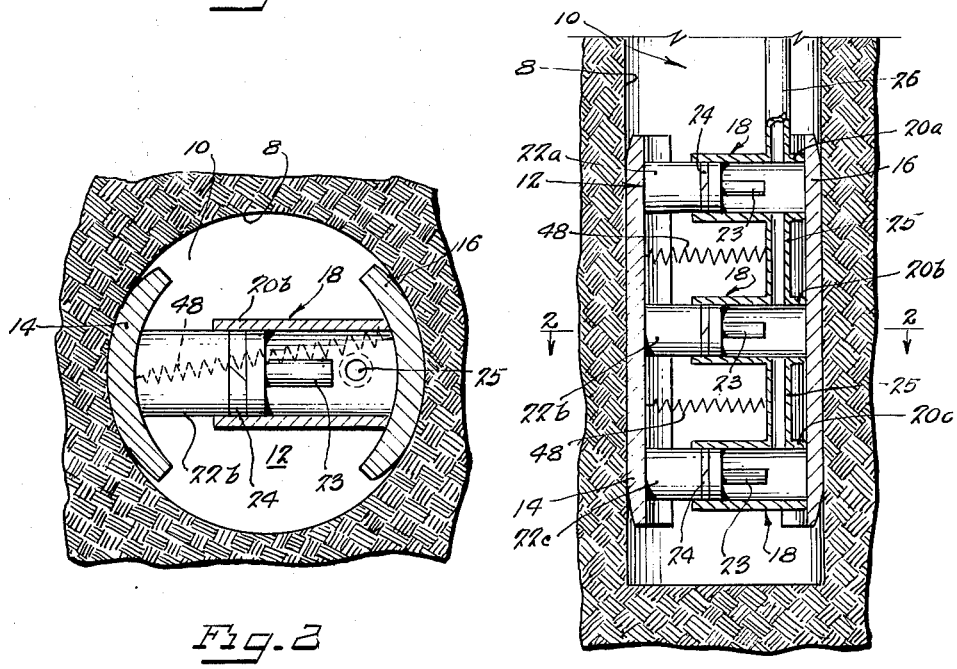

In the drawings:

FIGURE 1 is an elevational schematic illustration of one embodiment of apparatus in accordance with the present invention, and FIGURE 2 is a cross sectional view taken generally along line 2—2 of FIGURE 1.

In accordance with the present invention, a method is provided for generating seismic waves which method comprises applying a directive, time varying pressure to the side wall of a bore hole in the earth thereby straining the earth and generating a seismic wave.

In order to facilitate the description of the method in accordance with the present invention, an apparatus is described hereinafter which may be employed to practice the method. In the illustrated embodiment, a seismic wave is generated by applying pressure to the side wall 8 of a hole 10 drilled in the earth, the pressure being applied by a hydraulically actuated expander 12.

The expander 12 includes a pair of opposed vertically extending pusher members 14 and 16 of a structural material, such as steel or aluminum. In the illustrated embodiments the members 14 and 16 are plates which have generally the same shape, and in this connection, each of the pusher plates is generally arcuate in horizontal cross section, each forming a sector of an annulus having an outer radius equal to or slightly less than that of the hole 10. Preferably, so that the pusher plates 14 and 16 do not ruin the hole, the length of the sector of the annulus is made greater than one-fourth of the annulus. The outer faces of the pusher plates 14 and 16 are tapered inwardly at their edges and the outer edges are rounded so that the plates do not dig into the side wall 8 of the hole 10.

The pusher plates 14 and 16 are reciprocated by a power means which in the illustrated embodiment includes three vertically aligned piston-cylinder arrangements 18. The concave surface of one of the pusher plates 16 is connected to the closed end of three horizontally extending hydraulic cylinders 20a, 20b, and 20c by suitable means, such as welding. The concave surface of the other pusher plate 14 is connected to the outer ends of three horizontally extending pistons 22a, 22b and 22c, which are slidably received within the cylinders 20a, 20b and 20c, respectively.

A horizontally extending, cylindrical spacer 23 is joined to the inner surface of each of the pistons 22 to prevent the pistons 22 from blocking the inlet to the cylinders. A piston ring 24 of suitable material, such as rubber, is provided on each of the pistons 22. The pistons and cylinders are made of a suitable structural material, such as steel or aluminum.

The illustrated cylinders 20a, 20b and 20c are interconnected in fluid communication by conduits 25. Pressurized hydraulic fluid is supplied to the cylinders 20 by means of a transmission line 26 which is connected by one end to the upper cylinder 20a and extends vertically therefrom to the surface of the earth. The other end of the transmission line 26 is connected to the outlet of a conventional hydraulic pump 27. The application of pressure to the cylinders 20 is selectively controlled by a shut-off valve 28 disposed in the transmission line 26. The inlet of the hydraulic pump 27 is connected to a suitable reservoir 30 of hydraulic fluid. The outlet pressure of the pump is measured by a conventional gauge 32.

Connecting with the shut-off valve 28 and the transmission line 26 is a second transmission line 34 which in turn is connected to a quick release valve 36 of conventional construction. The valve 36, in turn, is connected through a third transmission line 38 to a dead space chamber 40 which, as hereinafter described, controls the total motion of the pusher plates and the time for subsequent pressure build-up. The chamber 40 is coupled through a valve 42 to the hydraulic reservoir 30.

So that the expander 12 may be easily removed from the hole, the pusher plates 14 and 16 are biased in an inwardly direction by a pair of relatively weak tension springs 48. Thus, when the hydraulic pressure is completely released by simultaneously opening the valves 36 and 42, the pusher plates 14 and 16 are retracted by the springs 48.

While the present embodiment employs springs 48 for retracting the pusher plates 14 and 16, other means may be employed for this purpose. For example, one could utilize double acting pistons and retract the pusher plates by hydraulic pressures provided by an auxiliary pump or by suitable valving. One might also apply a vacuum to the hydraulic system and thereby allow the pusher plates to retract under air pressure.

The valve 28 is preferably located close to the piston-cylinder arrangement 18 so as to avoid a static pressure head on the expander 12 which would make removal difficult.

The illustrated seismic wave source is particularly designed to generate a step function wave and thereby simulate a wave generated by an explosive. To generate such a wave, the hole 10 is drilled into the ground and the expander 12 is lowered into the hole by means of a cable (not shown) attached to the upper cylinder 20a. The shut-off valve 28 is then opened, thereby allowing the hydraulic pump 27 to transmit hydraulic fluid to the cylinders 20a, 20b, and 20c. The pusher plates 14 and 16 are thus pressed against the side wall 8 or the hole 10, thereby stressing the earth. The pressure in the cylinders 20a, 20b, and 20c is built up until a predetermined pressure is reached. The shut-off valve 28 is then closed and the pressure in the cylinders 20a, 20b and 20c is rapidly relieved by opening the release valve 36. The hydraulic fluid flows through the valve 36 to the chamber 40 until the pressures in the chamber 40 and in the cylinders 20 equalize. In this way the movement of the pusher plate can be adjusted to a definite desired amount. In this way the pusher plates 14 and 16 can be maintained in contact with the wall of the hole 8 with a light pressure, and the springs 48 prevented from squeezing an unnecessarily large amount of hydraulic fluid from the system.

The valve 36 is then closed and the valve 42 is opened to allow the chamber 40 to drain into the reservoir 30. The system is then ready for another operation. The pressure release time may be controlled by selection of valve sizes so that the pressure drop is rich in frequency components of a useful range.

Since the expander 12 applies forces in opposite directions, the expander 12 employs the strength of the earth itself to push against. Therefore, the force produced by the expander 12 may be appreciable and are not limited by the weight of the apparatus.

In one illustrated embodiment of the seismic wave source, a 6-inch diameter hole is drilled 10 to 100 feet into the ground. The expander includes a pair of steel pusher plates, each of which is approximately ¼ of an inch in thickness, 18 inches in height, and 5 inches in the length of the arc. Each of the plates is formed on a radius of approximately 6 inches. Each of the three cylinders has a cross sectional area of 2.7 square inches. A pressure of 2500 pounds per square inch is applied to each piston and this results in a pressure of 225 pounds per square inch being applied to the earth at each of the pusher plates and a total force of over 10 tons. This expander weighs about 53 pounds. The pressure is then released in approximately $2 \times 10^{-3}$ seconds.

It should be understood that, while in the above described embodiment a step pressure wave is provided, the hydraulic pressure within the cylinders may be programmed so as to generate any predetermined sequence of pressure by methods familiar to those proficient in hydraulic engineering. A particularly useful sequence is a gated continuous wave train having a single frequency. In this sequence, the hydraulic pressure may be oscillated between predetermined pressures to provide the gated continuous wave train. A frequency modulated wave train may be provided by changing the frequency of oscillation.

Moreover, in accordance with the present invention, directive pressure may be applied to the side wall of the hole by other types of systems, such as a pneumatic system, mechanical system, etc. Also, other devices, which exert a directive pressure in opposite directions, may be employed as an expander. It should be realized that the forces need not be applied along only one line but instead multiple jacks at various angles may be employed. Also, a single cylinder-piston arrangement may be employed. The cylinders may be machined from a solid block of materials and/or the pistons may be connected to separate pusher plates.

From the above it can be seen that a seismic wave generator and method are provided which generate seismic waves in the earth in a relatively economical manner. The apparatus does not destroy or alter the bore hole or surrounding earth and hence may be "fired" repeatedly to obtain as many identical "shots" as desired.

The apparatus may be programmed to produce seismic waves that are various functions of time. The generator employs the strength of the earth itself to push against and thereby is capable of generating relatively high powered waves. In this connection, the force that may be applied by the expander is limited by the strength of the earth and not by the weight of the apparatus nor by the strength of the materials from which it is made. The earth normally has a high strength. For example, a force of at least 50 tons may be applied by 19-inch long pusher plates to the wall of a 6-inch diameter bore hole in a typical shale formation. After small initial creeping, the earth behaves like an elastic member.

Various other changes and modifications may be made in the above described seismic wave generator and method without deviating from the spirit or scope of the present invention. In addition, it should be recognized that the entire hydraulic apparatus, including an electrically powered pump, could be lowered into the hole to a point just above the expander and controlled electrically from the surface.

Various features of the present invention are set forth in the accompanying claim.

What is claimed is:

An apparatus adapted to be disposed in a hole in the earth for generating seismic waves, which apparatus comprises at least one cylinder, a first arcuate member connected to a closed end of said cylinder with the convex surface thereof facing outwardly, a piston slidable within said cylinder, a second arcuate member connected to said piston with the convex surface thereof facing outwardly, the radius of said member being slightly less than the radius of said hole, a hydraulic transmission line connected to said cylinder, a source of pressurized hydraulic fluid connected to said transmission line, a first valve in said transmission line between said source and said cylinder, a second transmission line connected to said first transmission line between said valve and said cylinder, a sink for the hydraulic fluid connected to said second transmission line, and a second valve connected in said second transmission line between said first transmission line and said sink.

References Cited by the Examiner
UNITED STATES PATENTS

| | | | |
|---|---|---|---|
| 984,449 | 2/1911 | Stewart | 166—207 |
| 2,244,484 | 6/1941 | Beers | 181—.5 |
| 2,821,256 | 3/1954 | Boller | 166—187 |
| 2,892,501 | 6/1959 | Boller | 166—100 |
| 3,034,594 | 5/1962 | Menzel et al. | 181—.5 |

SAMUEL FEINBERG, *Primary Examiner.*

CHESTER L. JUSTUS, *Examiner.*